US012007995B2

United States Patent
Furlan et al.

(10) Patent No.: US 12,007,995 B2
(45) Date of Patent: Jun. 11, 2024

(54) QUERY GENERATION FROM EVENT-BASED PATTERN MATCHING

(71) Applicant: Capital One Services, LLC, McLean, VA (US)

(72) Inventors: Elizabeth Furlan, McLean, VA (US); Chih-Hsiang Chow, McLean, VA (US); Steven Dang, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 307 days.

(21) Appl. No.: 17/372,818

(22) Filed: Jul. 12, 2021

(65) Prior Publication Data

US 2023/0011128 A1 Jan. 12, 2023

(51) Int. Cl.
*G06F 16/2453* (2019.01)
*G06F 16/9532* (2019.01)

(52) U.S. Cl.
CPC .... *G06F 16/24545* (2019.01); *G06F 16/9532* (2019.01)

(58) Field of Classification Search
CPC .............. G06F 16/24545; G06F 16/9532
See application file for complete search history.

(56) References Cited

U.S. PATENT DOCUMENTS

| 6,895,388 B1 * | 5/2005 | Smith ................ G06Q 30/0641 705/26.62 |
| 2018/0004751 A1 * | 1/2018 | Vikhe .................... G06F 16/248 |
| 2020/0065412 A1 * | 2/2020 | Braundmeier ...... G06F 16/2455 |
| 2022/0092621 A1 * | 3/2022 | Abdallah ................ G06F 16/29 |

* cited by examiner

*Primary Examiner* — Kannan Shanmugasundaram
(74) *Attorney, Agent, or Firm* — Perkins Coie LLP

(57) ABSTRACT

A set of queries from an application executing on a client computing device is obtained. A first database based on the set of queries is searched to select a set of event types. A set of predicted parameters associated with the set of event types is sent to the application. The application includes instructions to obtain a first parameter and the set of predicted parameters via a user interface of the application and generate a message comprising the first parameter and an indicator identifying the set of predicted parameters. The first parameter and the indicator are obtained via the second message. A combined query including the first parameter and the set of predicted parameters is generated in response to obtaining the indicator. A vehicle record from the vehicle database is obtained based on the combined query. Values of the vehicle record are sent to the client computing device.

20 Claims, 4 Drawing Sheets

QUERY GENERATION FROM EVENT-BASED PATTERN MATCHING

BACKGROUND

Database queries are performed to store, retrieve, and update various types of records that may be of interest to a user or another computer system. The querying system and corresponding fields of a database may account for both direct inputs from a user and indirect events associated with the user. A user interface may communicate with the querying system by providing query parameters indicating various types of inputs from interactions with the user interface or other events. This communication may occur between the user interface and the querying system may occur over a set of messages sent over wired or wireless communication links.

SUMMARY

Aspects of the invention relate to methods, apparatuses, media, and/or systems for increasing network and system efficiency based on previous user inputs. After obtaining a set of queries, user gaze data, or other inputs from a client computing device, a computer system performs operations to retrieve records based on the inputs or other query parameters that are determined from the inputs. In many cases, these query parameters are uploaded from a client computing device, where connections may apply significantly more constraints on data upload than data downloads. Minor increases in the amount of data that is necessary to be transferred from the client computing device to a server may result in noticeable performance decreases for the client computing device due to the frequency of data transfer and limitations on the upload speed of a user's client computing device.

Methods and systems described herein may provide operations that may increase search responsiveness and reduce network bandwidth when performing queries. Some embodiments may further use the inputs to predict query parameters of future queries by comparing the data with previous users. As an example, such methods or related systems may predict inputs for a database query and determine corresponding outputs based on the predicted inputs. In some embodiments, the predicted inputs are sent to a client computing device, where the client computing device may then respond with a set of query parameters that does not include any correctly predicted input(s) and instead indicates the correctly predicted input(s).

In some embodiments, a set of event values is obtained from an application executing on a client computing device. In some embodiments, a first database is searched based on the set of event values to select a set of event types, where the searching includes selecting the set of event types such that each criterion of a set of criteria associated with the set of event types is satisfied by at least one value of the set of event values. In some embodiments, a predicted value associated with the set of event types is sent to the application via a first message. The application may include instructions to obtain a first value and the predicted value via the application and generate a second message comprising the first value and an indicator identifying the predicted value. In some embodiments, the first value and the indicator are obtained via the second message. In some embodiments, a combined query that includes the first value and the predicted value is generated. In some embodiments, a record from a second database is retrieved based on the combined query, and a value of the record is sent to the client computing device via a second message.

In some embodiments, a query sequence comprising queries from a user application executing on a client computing device may be obtained via a set of previous vehicle-related web requests. An events database may be searched based on the query sequence to select an event type sequence comprising a sequence of event nodes. The searching operation may include matching each query of the query sequence with an event node of the event type sequence such that 1) a position of the query in the query sequence is the same as a position of the event node in the event type sequence, and 2) the query satisfies a set of criteria associated with the event node. A set of predicted parameters may be sent via a first web response associated with a terminal node of the event type sequence to the user application. The user application may comprise instructions to obtain, via a user interface of the user application, a set of parameters from a user, the set of parameters comprising the set of predicted parameters. The user application may also include instructions to update the set of parameters to remove the set of predicted parameters and generate a first web request comprising the updated set of parameters and an indicator that the set of predicted parameters was entered into the user interface. In some embodiments, the updated set of parameters and the indicator may be obtained via the first web request, and a combined query may be generated, where the combined query includes the updated set of parameters and the set of predicted parameters in response to obtaining the indicator. In some embodiments, a set of vehicle records may be retrieved from a vehicle database based on the combined query, and a set of identifiers of the set of vehicle records may be sent to the client computing device via a second web response.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Example Systems

Figure 1:
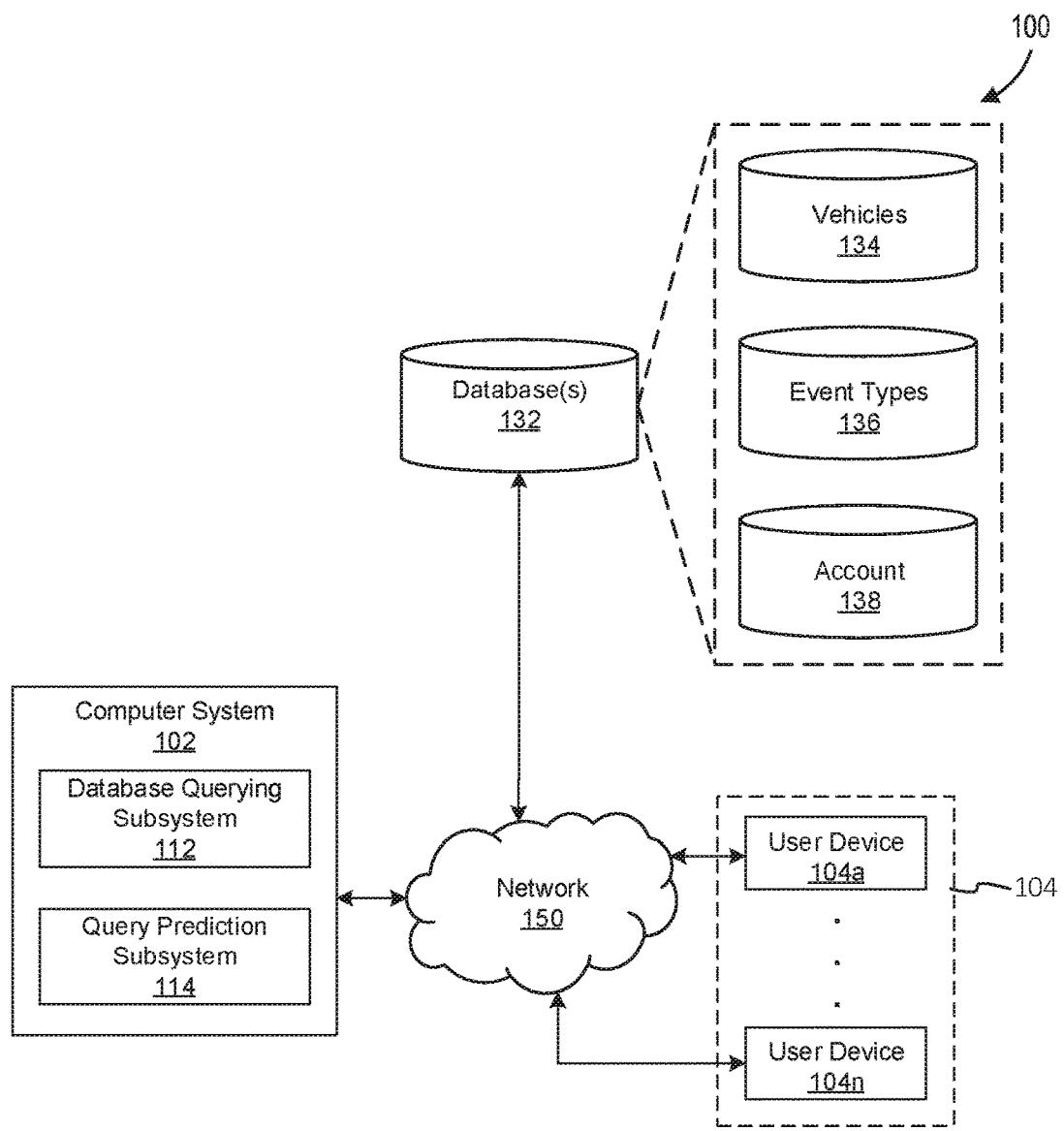
FIG. 1 shows a system for predicting queries based on inputs, in accordance with one or more embodiments.

FIG. 1 shows a system for predicting queries based on inputs, in accordance with one or more embodiments. As shown in FIG. 1, system 100 may include computer system 102, a set of user devices 104 including user devices 104a-104n, or other components. Computer system 102 may include a database querying subsystem 112, query prediction subsystem 114, and/or other components. Each user device of the set of user devices 104 may include any type of mobile terminal, fixed terminal, or other device. By way of example, a user device of the set of user devices 104 may include a desktop computer, a notebook computer, a tablet computer, a smartphone, a wearable device, or other user device. Users may, for instance, utilize one or more of the set of user devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of the computer system 102, those operations may, in some embodiments, be performed by components of the set of user devices 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine learning model in one or more embodiments).

In some embodiments, the system 100 may determine query parameters based on past query parameters of queries or other events stored in transaction records. As used in this disclosure, a transaction record may include a record of a database transaction, where a database transaction may include a set of queries to a database. In some embodiments, a first transaction record of a set of records may store values of a first query to a database from a user, and a second transaction record of the set of records may store values of a second query to the database from the same user. Alternatively, or in addition, a transaction record may store values from both a first and second query to a database from the same user.

Some embodiments may obtain query parameters from the set of user devices 104 via a set of wired or wireless signals. A user device of the set of user devices 104 may display a user interface (UI) that includes UI elements such as search bars, dropdown menus, radio dials, and hyperlinks. A user may interact with these UI elements to submit a set of query parameters. In addition, one or more devices of the set of user devices 104 may include sensors to detect data about the users, such as a gaze direction of a human eye, sound, and physical user motion. As further discussed below, these observations may be converted into recorded events in data and used to generate additional query parameters for a predicted query. In some embodiments, these additional query parameters may determine a search parameter using a prediction model, such as a machine learning model or statistical model.

In some embodiments, the system 100 may generate query parameters for a database to predict future queries based on detected patterns of events. As used in this disclosure, an event may include the submission of a query, the query parameters of the query, various types of measured observations indicating a user behavior or another occurrence that is associated with a recorded time or time interval. For example, an event may include a set of gaze tracking values sorted by their corresponding timestamps, cursor movements, text highlighting, voice recordings, set of previously visited webpages, set of previously viewed items, or the like. Some embodiments may obtain the event values of an event from a user application executing on a client computing device and search a database based on the event values. Some embodiments may search the database by matching event values with a corresponding event-related criterion of an event type and selecting one or more event types based on the matches. Once an event type is found, the system 100 may select a set of values associated with the event type, such as a value that is stored in a node that is connected to or part of a graph portion of a graph database representing a set of event types. As used in this disclosure, an event type refers to a type of events, where each event of the event type shares one or more event values of the event type or otherwise satisfies the set of criteria of the event type.

Some embodiments may use the selected set of values as a set of predicted query parameters and send the set of values to a client computing device of the set of user devices 104, which may include instructions to determine whether a user interacted with a UI element that indicates the selection of the set of predicted query parameters. Alternatively, or in addition, some embodiments use the set of values as inputs for a function to predict a set of query parameters and send the set of predicted query parameters to the client computing device. The client computing device may determine which query parameters were selected based on a user's interaction with UI elements of a UI and determine that the set of predicted query parameters were selected by the user. In response, some embodiments may generate or update an outgoing web message indicating that the set of predicted query parameters were selected without including the values of the set of predicted query parameters. The indicator of this selection requires less data than the values themselves, which may result in reducing the total network throughput requirements during upload or otherwise reducing network resource utilization for the client computing device. Some embodiments may then retrieve records from a database using a combined query generated from non-predicted query parameters sent in the second web message and the predicted query parameters. Some embodiments may further accelerate record retrieval by having pre-queried the database based on the predicted query parameters and further search the resulting records based on the non-predicted query parameters provided by a user. Some embodiments may then send the search results of the query from the database to the client computing device.

In some embodiments, a machine learning model may include one or more neural networks. As an example, neural networks may be based on a large collection of neural units (or artificial neurons). Neural networks may loosely mimic the manner in which a biological brain works (e.g., via large clusters of biological neurons connected by axons). A neural unit may receive a set of inputs and produce a set of outputs. Each neural unit of a neural network may be connected with many other neural units of the neural network, where the output of a first neuron may be provided as an input to a second neuron. Such connections can be enforcing or inhibitory in their effect on the activation state of connected neural units. In some embodiments, each individual neural unit may use a summation function or other aggregation function which combines the values of its inputs together. In some embodiments, each connection (or the neural unit itself) may have a threshold function such that the value(s) of an input(s) must surpass the threshold before the value(s) or result of the value(s) are propagated as outputs to other neural units. These neural network systems may be self-learning and trained, rather than explicitly programmed, and can perform significantly better in certain areas of problem solving, as compared to traditional computer programs.

The functions or internal parameters of a neural unit in a neural network or an architecture of the neural network may provide additional features. Some embodiments may use a feed-forward neural network, which may provide features such as faster results. Some embodiments may use a neural network having multiple layers (e.g., where a signal path traverses from front layers to back layers) to increase accuracy. In some embodiments, back-propagation techniques may be utilized by the neural networks, where forward stimulation is used to reset weights on the "front" neural units. In some embodiments, stimulation and inhibition for neural networks may be more free flowing, with connections interacting in a more chaotic and complex fashion. As further described below, some embodiments may use concurrently different types of machine learning models to perform different tasks.

Subsystems 112-114

In some embodiments, the database querying subsystem 112 may search or update, at least in part, one or more values of a database(s) 132, such as a vehicle database(s) 134, an event types database(s) 136, or an account database(s) 138. The account database(s) 138 may include account records that represent individual users, entities, sets of other accounts, etc. An account record may include indicators of previous events associated with a user of the account, such as previous queries, previously observed gaze data, previous transactions, or the like. For example, an account record may store a set of previous queries made by a user via a set of previous vehicle-related web requests and a set of previous vehicle purchases made by the user. Additionally, an account record may include identifiers, references, links, or other indicators of other account records. For example, an account record may store pointers to other account records with which the account record has been indicated to have shared event types based on pattern matching operations. Pattern matching operations may include determining, in a sequential order, each event of a sequence of events satisfies a set of criteria of a corresponding event of a sequence of event types.

Some embodiments may store different versions of the account record in different types of databases or store different portions of an account in different databases. For example, an account for a user may include a first record in a SQL database storing a user identifier and a second record in a graph database indicating sequences of graph nodes of the graph database representing queries made by the user. In some embodiments, an account record may store values representing user behavior. Such values may include gaze measurements, categories representing UI elements that a user has viewed, images of records or record types that a user has tapped or clicked on, or the like.

In some embodiments, an event types database(s) 136 may store a record of events or event types, where the events may include a submission of a query. A record of events may include a set of event values, where the set of event values may include a set of query parameters of the query, gaze-related data, other user-related data, or the like. As described elsewhere in this disclosure, the event types may include a set of criteria used to determine whether an event of the event type occurred. In some embodiments, events including event identifiers and their corresponding set of event values may be stored as a SQL database. Alternatively, or in addition, some embodiments may use other data structures that associate different events. For example, some embodiments may store a graph representing event types in the form of set of arrays, where at least one array of the set of arrays may represent a set of graph edges of the graph and another array of the set of arrays may represent weights associated with the set of graph edges.

The query prediction subsystem 114 may be used to predict query parameters to query one or more databases of the database(s) 132. The query prediction subsystem 114 may select, based on a sequence of events, a set of nodes of a graph database representing event types. IN some embodiments, each respective node of the selected set of nodes may map to or otherwise represent a different event subtype of an event type and retrieve one or more values associated with the different event types. As used in this disclosure, a respective node of a set of nodes may be described as mapping to a respective event subtype based on the respective node including an identifier of the event subtype, including a criterion used to identify the event subtype, be listed in association to the event subtype, etc.

As described elsewhere in this disclosure, the event types database(s) 136 may include a graph database, where nodes of the graph database may store data usable for a set of criteria. Some embodiments may use the query prediction subsystem 114 to select a first node of the graph database based on an initial set of query parameters and select connected nodes to the most recently selected node (starting with the first node) based on whether a set of criteria associated with the node is satisfied. For example, a second node that is connected with the first node in the graph database may be associated with a criterion that a subsequent query of a first query represented by the first node includes the n-gram "x1y2z3." In response, some embodiments may include the first and second nodes of a graph portion associated with a sequence of event types that is associated with a predicted query value. In addition to direct queries by the user, some embodiments may determine an event type based on other values such as gaze locations, patterns of gaze locations, n-grams or categories determined from the gaze locations, or the like. For example, a node of the graph database may include or identify a criterion that is satisfied when a user is indicated to have gazed on the n-gram "very safe vehicle" for at least ten seconds.

Alternatively, or in addition, the query prediction subsystem 114 may perform a clustering operation to determine a set of clusters of vectors generated from the features. A vector may represent a vectorized form of a set of features selected or extracted from a query or set of queries. The query prediction subsystem 114 may then select a set of event types. As described elsewhere in this disclosure, a distance threshold may be used to determine a set of points in a feature space representing groups of predicted query parameters based on a point in the feature space that represents a provided set of query parameters. In some embodiments, each respective point of the set of points is bounded by the distance threshold in a feature space distance, path distance, or other distance of a user-provided query.

As described elsewhere in this disclosure, the database querying subsystem 112, query prediction subsystem 114, or other subsystem may include machine learning models, statistical models, or other decision models to predict future queries. The machine learning models used in this disclosure or their associated model parameters may be stored in model database(s). For example, a set of machine learning models used in this disclosure may include recurrent neural networks, transformer models, point generation neural networks, or other models, and may be retrieved based on which model(s) is selected. Some embodiments may include operations to select different models based on computing resource availability or modify the architecture of a selected model. For example, some embodiments may increase or decrease the number of neural network layers based on an available amount of memory or processor resource.

Figure 2:
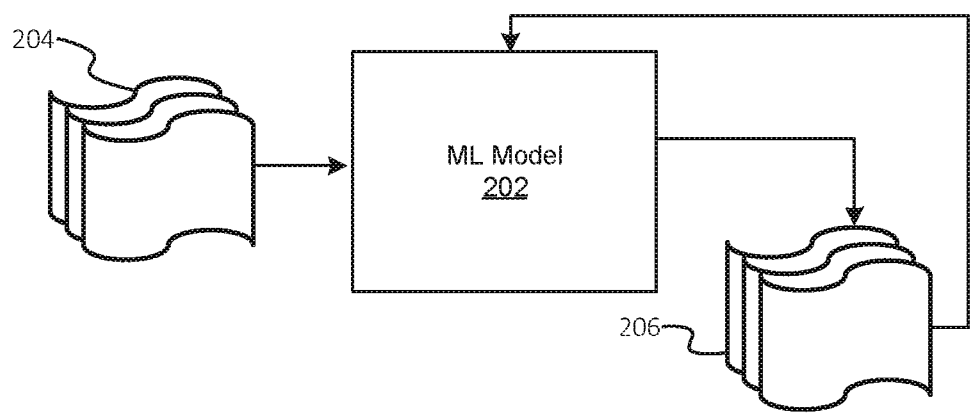
FIG. 2 shows a machine learning model to predict query parameters, in accordance with one or more embodiments.

FIG. 2 shows a machine learning model to predict query parameters, in accordance with one or more embodiments. A machine learning model 202 may use inputs 204 to provide outputs 206. In some embodiments, outputs 206 may be fed back to machine learning model 202 as inputs 204 to train machine learning model 202 (e.g., alone or in conjunction with user indications of the accuracy of the outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). For example, some embodiments may predict a set of query parameters that will be subsequently selected by a user and then update its model parameter configurations based on a determination that one or more parameters of the set of predicted query parameters were not selected.

In some use cases, the machine learning model 202 is a neural network, and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

In some embodiments, the inputs 204 may include multiple data sets such as a training data set and a test data set. For example, in some embodiments, a training data set or a test data set may include a set of records that include previously-submitted queries and a corresponding set of values of the record, such as a set of values obtained from a set of transactions identifying the record. Some embodiments may use the training data set to train a machine learning model to determine one or more category values based on a transaction or record associated with the transaction. For example, as shown in FIG. 2, the inputs 204 may include a sequence of queries, a set of gaze locations collected from eye movement measurements, sound collected from a user, or the like. The machine learning model 202 may use the inputs 204 to determine the output 206, where the output 206 may include text, a quantitative score, a category value, or another value that may be used to determine a search parameter, as described elsewhere in this disclosure. In some embodiments, the output 206 may then be displayed on a graphic user interface.

Figure 3:
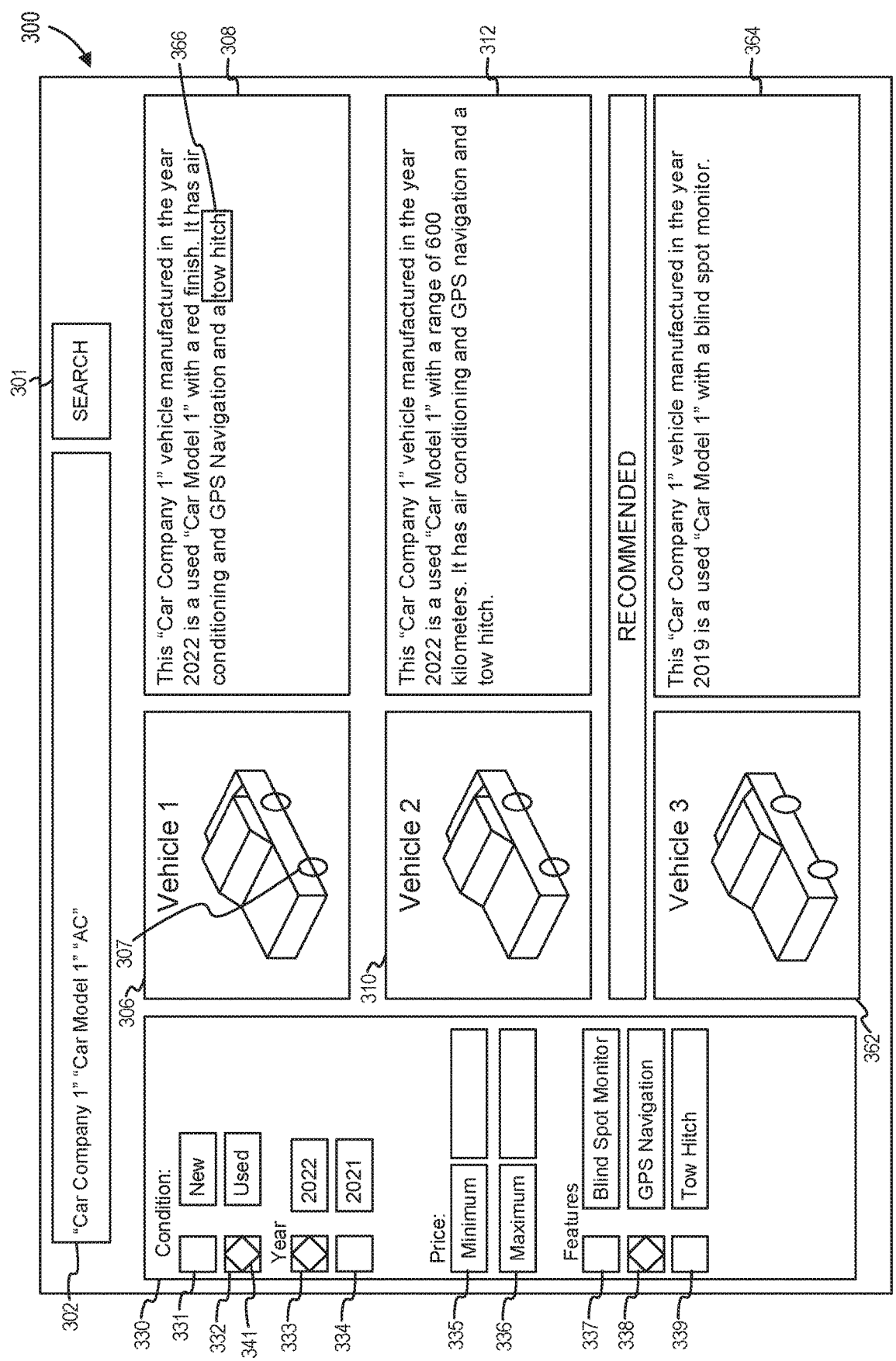
FIG. 3 shows an example user interface, in accordance with one or more embodiments.

FIG. 3 shows an example user interface, in accordance with one or more embodiments. Elements of the UI 300 may be used to generate a query usable for searching through a set of records to identify a corresponding set of vehicles based on the query. Some embodiments may send program code for a user application to a client computing device instructing the application to display the UI 300. The UI 300 includes a search bar 302 that a user may use to submit a first query or portion of the first query, where an interaction with the search button 301 may cause the user application to send a web message to a server. The search filter window 330 includes UI elements 331-339, each of which may be used to indicate additional filters for a search result. For example, a user may interact with the UI element 331 to indicate whether or not a vehicle satisfying the parameters of a query should be classified as a "new" vehicle. As shown by a comparison between the UI element 331 and the UI element 332, which shows that the UI element 332 has an extra icon 341 inside of the UI element 332, some embodiments may visually indicate the selection of a search filter.

Some embodiments may provide the user application executing on the client computing device with a set of search results from records of a database. As shown in the UI 300, providing the search results may include providing images, text, or other data from a record that is retrieved based on a query submitted by a client computing device. For example, a first and second record may be retrieved based on previous queries provided by a user via a set of previous vehicle-related web requests. The image 306 and the corresponding text 308 may be obtained from a first record, and the image 310 and the corresponding text 312 may be obtained from a second record. As described elsewhere in this disclosure, some embodiments may determine a set of query parameters for queries that are determined to have a high likelihood of being selected by the user in a future query. Some embodiments may retrieve a third record based on the future query and provide data from the third record, such as an image 362 and text 364.

Some embodiments may provide program code to obtain gaze data, where the gaze data is collected while a user is using the UI 300. Some embodiments may perform a set of gaze tracking operations to collect gaze data, where the gaze data may be stored as a set of gaze locations. The gaze locations collected by gaze tracking operations may indicate a position on a screen indicating where the gaze of the user is focused. Various types of gaze location operations may be performed to determine the gaze location. Alternatively, or in addition, some embodiments may obtain the gaze data in the form of information that is processed based on a gaze location, where the information may indicate a set of viewed user interface elements. For example, if a gaze location is focused on the n-gram 366, which cites the phrase "tow hitch," some embodiments may obtain the n-gram "tow hitch" as a viewed UI element from a message sent by the client computing device. Furthermore, some embodiments may determine that an image or a portion of an image is being viewed by a user. For example, some embodiments may determine that a user's gaze is focused on the image 306 or a component of the image 306, such as the wheel 307. As described elsewhere in this disclosure, some embodiments may use the gaze data to determine event values and to determine whether a set of event criteria are satisfied.

As described elsewhere in this disclosure, some embodiments may modify the web message sent from a user application that communicates queries entered into the UI 300. For example, some embodiments may determine that the vehicle features "tow hitch" and "blind spot monitor" will be selected as future query parameters. Some embodiments may then send a UI-updating message to a client computing device that includes "tow hitch" and "blind spot monitor" as predicted query parameters to a client computing device. In some embodiments, a user may interact with the UI element 337 and the UI element 339 to select the query parameters "blind spot monitor" and "tow hitch." An application may compare the selected query parameters to the predicted query parameters and determine that the selected query parameters match the predicted query parameters. The application may then modify a query sent from the user application to reduce the amount of data being consumed by the user application by reducing indicators for the query parameter "blind spot monitor" and "tow hitch" into a single indicator to indicate that the predicted values for the user are selected in the subsequent query.

Some embodiments may reconfigure the UI 300 from a first configuration into a second configuration based on one or more predicted values. For example, some embodiments may determine that the UI element 339 corresponding with the search filter "tow hitch" will be assigned a value in a set of search filters of a future query based on a match between a previous sequence of queries and an event type sequence. Some embodiments may reconfigure the UI 300 from a first configuration to a second configuration, where a set of user interface element positions of a set of UI elements may be shifted. For example, in some embodiments, the UI element 335 may be below the UI element 331 in the first configuration and may be above the UI element 331 in the second configuration, where the above and below in this example may refer to a screen position of the UI elements on a graphic display screen.

Example Flowchart

Figure 4:
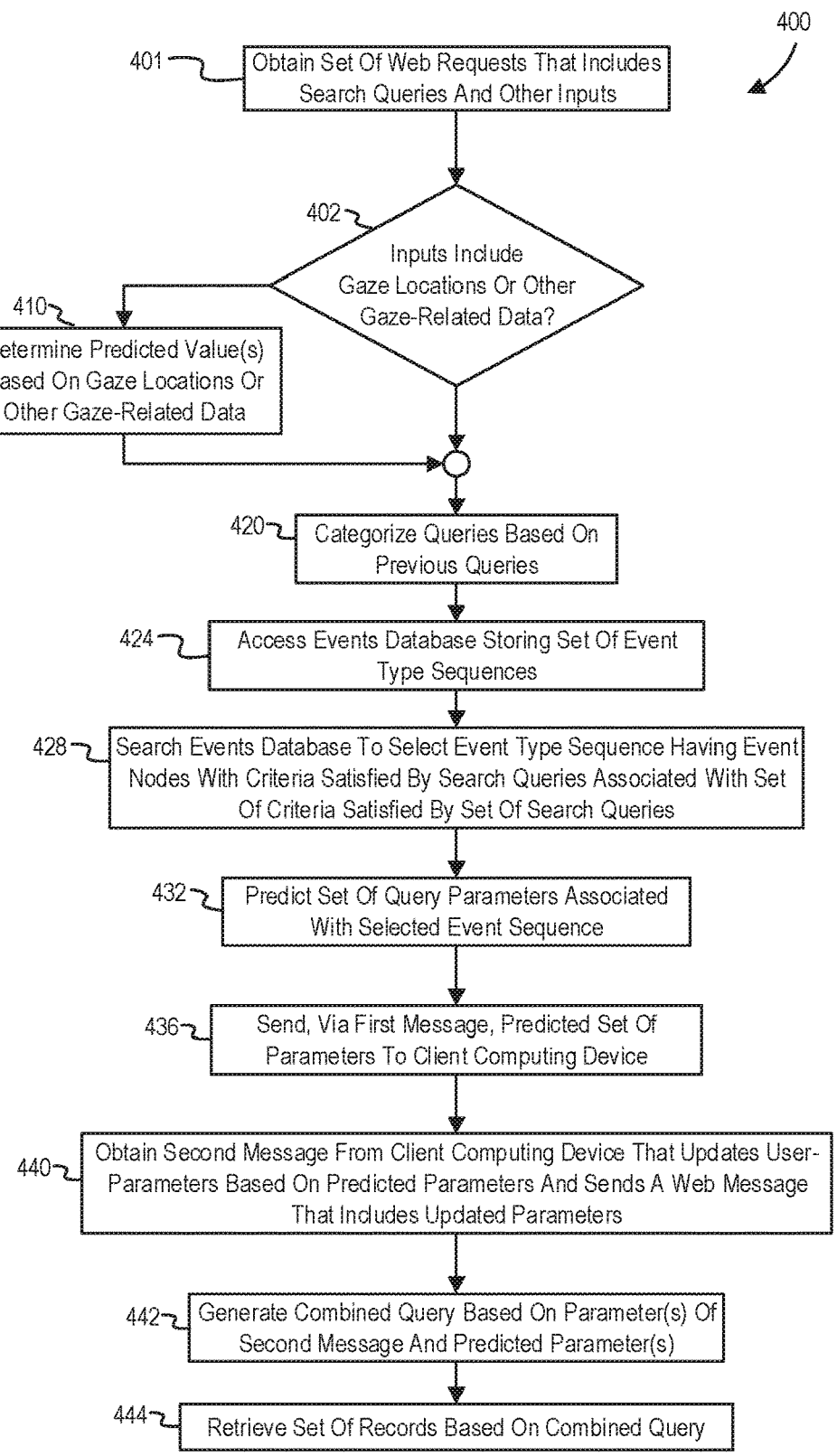
FIG. 4 shows a flowchart of operations to use query parameters and collected data to generate queries for record retrieval, in accordance with one or more embodiments.

FIG. 4 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described or without one or more of the operations discussed. For example, some embodiments may perform operations of the process 400 without performing operations to determine whether the set of inputs include gaze locations, indications of viewed UI elements, or other gaze data as described for the operation 402. Additionally, the order in which the processing operations of the methods are illustrated (and described below) is not intended to be limiting.

In some embodiments, the process may be implemented in a system that includes one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of operations to use query parameters and collected data to generate queries for record retrieval, in accordance with one or more embodiments. Operations of the process 400 may begin at operation 401. In the operation 401, some embodiments obtain, via a set of web requests, a query sequence or other event values. In some embodiments, the query parameters of a set of queries may be obtained from a UI search bar, where the queries may be obtained as a sequence of queries. For example, a first query may be obtained from a message sent by a client computing device at a first time, and a second query may be obtained from a second message sent by the client computing device at a second time. The first query and second query may each include a respective set of query parameters that may be obtained from a set of UI elements such as a search bar, a set of checkboxes, a set of drop-down menus, other UI elements permitting a user to select one or more category values from a set of categories, etc. For example, a web message may include an indication that a user has selected a first set of category values using a set of UI elements and may further include a set of strings entered by the user into a search bar.

Some embodiments may obtain a query sequence by obtaining a most recent query from a user and combining the most recent query with a sequence of previously entered queries by the user. For example, some embodiments may obtain a first set of inputs sent from a client computing device via a message that identifies or is otherwise associated with a user "user 01". The first set of inputs include a first query, a set of viewing patterns, and a set of gaze data indicating UI elements or a related set of regions on a screen that the user "user 01" has viewed. Some embodiments may then combine the first set of inputs with a set of previous inputs by retrieving a set of previously used query parameters with the user "user 01." The set of previously used query parameters may include a sequence of previous queries, previous viewing patterns, previous gaze data, or other inputs associated with the user "user 01." As described elsewhere in this disclosure, some embodiments may store the set of previously used query parameters in various ways, such as in the form of a SQL table, graph database, etc.

The gaze data may be provided in the form of gaze locations on a screen, where the region on the screen surrounding the gaze locations may also be provided. For example, some embodiments may provide a first set of coordinates representing gaze locations, durations for which a user's gaze is detected to remain on the gaze locations, and a set of values indicating the set of regions of a text being viewed by the user. Alternatively, or in addition, some embodiments may provide gaze data that is in the form of pre-processed information based on the gaze locations, such as text, images, or UI elements upon which gaze locations correspond with. For example, some embodiments may provide gaze data in the form of words, names, phrases, or other n-grams associated with a gaze location.

As described elsewhere in this disclosure, some embodiments may provide program code to display the UI or send gaze data. In some embodiments, the program code may include instructions to modify the communication rate of data being transmitted by a client computing device based on the network performance of the network connection between the client computing device and a server used to categorize a query, access a stored set of event type sequences, or perform other operations of the process 400. Some embodiments may determine whether a network limit is satisfied based on a set of performance metrics indicating the state of network performance between a client computing device and a server. In some embodiments, the set of performance metrics may include a latency measurement, bandwidth measurement, or other metrics of network performance. Some embodiments may modify the communication rate by reducing the amount of data being reported by the client computing device in response to the network limit being satisfied by the set of performance metrics. For example, some embodiments may determine that an average latency is greater than a network limit of 100 milliseconds, which satisfies the network limit. In response, some embodiments may reduce the frequency of communication for gaze data to once every 10 seconds. Various other data reduction operations may be performed, such as increasing the required number of gaze locations needed to define a reportable cluster of gaze locations.

Some embodiments may provide named entities to the client computing device that permit the client computing device to recognize the named entities. For example, some embodiments may provide the n-gram "Car Maker 32" in a list of values indicated as a list of named entities to a client computing device. The client computing device may then execute program code to recognize that a user has viewed the n-gram "Car Maker 32" based on gaze data collected by the client computing device. The client computing device may then send a message that includes a set of inputs provided by a user, where the set of inputs may include gaze data indicating that the user spent five seconds or more viewing the n-gram "Car Maker 32." Alternatively, or in addition, some embodiments may perform one or more data processing operations based on the gaze data after receiving the gaze data, as discussed elsewhere in this disclosure.

In the operation 402, some embodiments may determine whether the set of inputs include gaze locations or other gaze-related data. As described above, the gaze data may include gaze locations as represented by coordinates or other set of numeric values. Alternatively, or in addition, the gaze data may include named entities, categories, identifiers of UI elements, or other elements indicated or detected to have been gazed upon based on detected gaze locations. If a determination is made that the set of inputs includes gaze data, some embodiments may proceed to perform operations described by the operation 404. Otherwise, some embodiments may proceed to perform operations described by the operation 420.

In the operation 410, some embodiments may determine a set of predicted values based on the gaze locations or other gaze-related data. As described elsewhere in this disclosure, some embodiments may determine a set of n-grams such as words, phrases, named entities, etc. based on the gaze locations or other gaze data. For example, some embodiments may determine which n-grams corresponds with gaze locations having a corresponding gaze duration that satisfies a duration threshold. These n-grams may then be used as a set of predicted values. Alternatively, or in addition, these n-grams or other UI elements may be used to satisfy a set of criteria associated with a sequence of event types, which may then cause some embodiments to select one or more predicted values associated with the sequence of event types.

Various other values may be obtained based on gaze data and used to match with one or more events sequences of a set of events sequences, as described elsewhere in this disclosure. Some embodiments may use gaze measurements to determine that a user had viewed specific colors, shapes associated with specific categories (e.g., vehicle shape), other specific elements of an image, or the like. Some embodiments may also measure the amount of time that a user spends gazing on one or more UI elements. For example, some embodiments may obtain measurements corresponding with the amount of time that a user's gaze is tracked to focus on a search bar or a drop-down menu. Some embodiments may use these values as event values and match an event sequence that includes these event values to an event type sequence.

In the operation 420, some embodiments may categorize a query of the set of queries based on other queries of the set of queries. Categorizing a query may include categorizing the query into one of a set of mutually exclusive categories. For example, some embodiments may categorize a query as a "soft reset" based on the list ["hard reset", "soft reset", "continuation"], where the categorization of the query as a "soft reset" may prevent the query from being labeled as a "hard reset" or a "continuation." These category values may indicate the relationship between consecutive queries in a sequence of queries and may be assigned to a corresponding graph edge of a graph node to accelerate graph searches, as described elsewhere in this disclosure. As discussed elsewhere in this disclosure, some embodiments may determine patterns based on these category values.

Some embodiments may determine a similarity value between searches when categorizing a query. For example, some embodiments may determine that a search is a continuation search if a count of shared query parameters between two queries is greater than a first threshold. In some embodiments, a shared query parameter between two queries may be a parameter that is directly provided by a user via a UI element or may be a parameter derived from gaze-related data. For example, if a first query includes the parameters "red," car maker 1", and "engineType1," and a second query includes the parameters "red", "car maker 1", and "engineType2," some embodiments may determine that the count of shared query parameters between the first and second query is equal to two. Some embodiments may use multiple thresholds to determine which category value to assign to a query based on its similarity value to a previous query. For example, some embodiments may assign the category value "continuation" to a first query in response to a determination that the similarity value between the first query and a previous query is greater than a first threshold. Alternatively, some embodiments may determine that the similarity value is less than or equal to the first threshold but greater than a second threshold and, in response, assign the category value "soft reset" to the first query.

Alternatively, or in addition, some embodiments may categorize a query with one or more category values selected from non-exclusive categories. For example, some embodiments may assign the category values "fast search" and "local search" to a query in response to a determination that a user spent less than a duration threshold viewing the results of a query and included a filter to restrict the search results to records for items that are within a geographic range of a user. Some embodiments may also use these types of non-exclusive categories as criteria to search for a set of event types.

Some embodiments may access a user record or other user information associated with a user indicated as providing a query. For example, some embodiments may obtain a message indicating that a user having the user identifier "123321AZ142" provided a query that included the phrase "blue carmaker1 carmodel1" in a search bar. Some embodiments may then access a user profile or other set of user data associated with the user that is stored in an account record to determine a set of user categories for the user. As described elsewhere in this disclosure, some embodiments may use the data associated with the user to select or filter a plurality of event type sequences to a lesser set of event type sequence. By filtering the plurality of event type sequences based on user category, some embodiments may accelerate search result retrievals.

In the operation 424, some embodiments may access an events database storing a set of event types, where the set of event types may include event type sequences. As described elsewhere in this disclosure, a stored set of event criteria sequences may include a sequence of event types, where each event type may include or be otherwise associated with a satisfaction indicator to indicate that the event type is satisfied. An event type may be satisfied if a set of criteria corresponding with the event type is satisfied, where the set of criteria may be based on the values of the event type. For example, an event type corresponding with two criteria may be satisfied by a query if the query satisfies the two criteria.

As described elsewhere in this disclosure, an event type may be associated with criteria that are based on various types of inputs. In some embodiments, each of the criteria of an event type may be required to be satisfied in order to satisfy the event type. For example, a first event type may include a first value indicating a required string or category of string of a first query. The first event type may also include a second value identifying a category representing an object upon which a user's gaze is focused based on a set of inputs associated with the first query. Some embodiments may determine that a first message that includes the first query but does not include the second value does not satisfy the first event type, while a second message that includes the first query and gaze data indicating that the user's gaze was focused on the object does satisfy the first event type. Alternatively, or in addition, some embodiments may include an event type for which only a subset of the criteria is required to be satisfied. For example, a second event type may include a first value representing a category value assigned to a query and a second value representing an n-gram upon which a user is focused for at least 10 seconds. Some embodiments may determine that the second event type is satisfied by a message if the message includes a query classified as the first category value or includes gaze data indicating that the user's gaze has focused on instances of the n-gram for at least 10 seconds.

As described elsewhere in this disclosure, the stored set of event type sequences may be stored in a graph database, such as a database having index-free adjacency. For example, some embodiments may store an event type sequence in the form of a set of connected graph nodes of a graph database, where each graph node may include information corresponding to an event of the event type sequence. A graph node may be stored in various forms of a graph database, where the node identifier, node relationships, or node properties may be stored in a same or separate set of files or other data objects.

Alternatively, or in addition, some embodiments may store event type sequences in a set of records of an index database, such as a SQL database. In some embodiments, indices of a record of a SQL database may be assigned based on events of the event type sequence. For example, a record for an event type sequence may include a first index value representing a first event type and a second index value representing a second event type. As described further below, the use of the elements of an event type sequence to determine an index for the event type sequence may reduce the number of records that are searched through to determine an event type sequence that matches a set of queries over time or another set of inputs over time.

A respective event type stored in an event type sequence may include a set of values used to determine a set of criteria for the respective event type. For example, a first event type of an event type sequence may include a category value of a query, a second event type of the event type sequence may include a set of n-grams representing a first set of vehicle features for which a gaze duration was greater than five seconds, and a third event type may include a second set of vehicle features that can be provided in a query. In some embodiments, each event type of the event type sequence shares one or more event values. For example, each event type of an event type sequence may share an event value to indicate that each event of an event sequence must satisfy the same criterion based on the shared event value. Alternatively, some or all of the event types of an event type sequence may be associated with different criteria with respect to each other.

In the operation 428, some embodiments search the events database to select an event type sequence having event nodes that are associated with a set of criteria that is satisfied by the set of queries. As described above, some embodiments may select an event type sequence using data stored in a graph database. By storing event type sequences in a graph database, some embodiments may match a sequence of events to a set of inputs by traversing graph nodes of the graph database via a set of graph edges of the graph database. For example, a first event type sequence may include the sequence of three event nodes represented by the array '[[type1: "hard reset", make: "maker1"], ["continuation", make: "maker1", color: "red", control: "fully autonomous"], ["soft reset", make: "maker2", color: "red", control: "fully autonomous"],' where each sub-array of the array represents an event type node of the event type sequence. Some embodiments may search through the graph database for an initial node based on the categorization of a first query of a set of queries as being of the type "hard reset" and including the value "maker1" for the property "make" and select the first event node of the first event type sequence. Some embodiments may then select an event type sequence by searching through the event type nodes associated with the initial node based on a set of graph edges connected to the event type node. The search may cause some embodiments to find an adjacent event type node of the initial node that is satisfied by a set of inputs that are received at a later time. By using a graph database to find event type sequences, some embodiments may reduce the time needed to find an event type sequence for a sequence of events.

In some embodiments, an event type sequence may be satisfied by consecutive sets of inputs with respect to queries of the inputs. For example, a set of inputs may include a first subset of inputs that includes a first query from a client computing device and a second subset of inputs that includes a second query from the client computing device. Some embodiments may match the first subset of inputs to a first node of a graph node based on the first subset of inputs satisfying a first set of criteria of the first node and determine whether any of the nodes connecting to the first node have criteria that are satisfied by the second subset of inputs. The process may include then proceeding to select an additional connecting node of the most recently selected node based on the next input in the sequence of inputs satisfying the criteria associated with the additional connected node, where the event type sequence may be represented by the graph portion comprising the selected nodes. In some embodiments, the process may include filtering paths representing an event type sequence based on a determination that a category assigned to the set of graph edges connecting the graph nodes of the path is of one or more category values. For example, some embodiments may search for a next graph node of a first graph node by first filtering the set of next possible graph nodes by their corresponding graph edges, where each graph edge is categorized with the label "continuation." By filtering searches through a graph based on categories assigned to graph edges, some embodiments may increase the predictive accuracy of a search through a graph database.

Alternatively, or in addition, some embodiments may determine an event type sequence from a SQL table based on an index of the SQL table. As described elsewhere in this disclosure, some embodiments may search through an initial set of records of a SQL table, where the initial set of records may be filtered based on index values corresponding with one or more values of a set of inputs. For example, some embodiments may index the records of a SQL table by an initial value of a first event type and a set of inputs may be compared to the initial value of the first event type to select an initial set of records.

As described elsewhere in this disclosure, some embodiments may access a user's record or other data associated with the user. Some embodiments may assign a user category to the user based on the record or other data and select an initial plurality of event type sequences based on the user category. For example, after a determination that a user is categorized with the user category "User Category 01," some embodiments may determine a plurality of event type sequences by filtering a stored set of event type sequences into a smaller number of event type sequences. In some embodiments, the user category may be the same as the data associated with the user. For example, a user's record may include the value "high" to indicate that the user has an application usage frequency that is in the "high" range, and the corresponding user category may include the same value "high" or indicate the same information.

Some embodiments may determine whether a set of queries satisfies a set of sequence generation criteria associated with event type sequence generation in order to generate a new event type sequence. For example, some embodiments may store event type sequences in a database of event type sequences. After determining that an obtained query sequence satisfies the set of sequence generation criteria, generate a new event type sequence, and add the new event type sequence to a database of event type sequences. For example, some embodiments may add a subgraph including a sequence of graph nodes connected by graph edges to represent the new event type sequence in a graph database. In some embodiments, the set of sequence generation criteria may be based on the plurality of sets of event types already stored in the database of event type sequences. For example, the set of sequence generation criteria may include a criterion that the event type sequence to be generated does not already exist in a plurality of sets of event types.

Some embodiments may generate a new set of event types based on a plurality of query sequences. For example, some embodiments may receive a plurality of query sequences that includes a most-recently-received query sequence after receiving at least one other query sequence of the plurality of queries or accessing at least one other query sequence stored in a database. Some embodiments may then determine whether the plurality of query sequences shares a set of event values along the same query order in their respective query sequence. This set of shared event values may include a shared query parameter, a shared viewed UI element as detected by gaze tracking operations, or the like. For example, a first query sequence may include the query parameter "red" in a first query, the query parameters ["carmaker1", "red"] in a second query, and the query parameter ["fire-resistant", "carmaker1"] in a third query. A second query sequence may include the query parameter "red" in a first query, the query parameters ["carmaker1", "blue"] in a second query, and the query parameters ["hydrogen", "carmaker1"] in a third query. Some embodiments may then generate a sequence of event types by indicating a first event type associated with the shared value "red" in a first event type of the sequence of event types. The sequence of event types may also include a second event type associated with the shared value "carmaker1", which may then be followed by a third event type associated with the shared value "carmaker1." As discussed elsewhere, some embodiments may store an event type sequence in a graph database.

In addition to generating a new set of event types based on event sequences, some embodiments may merge different sets of event sequences. For example, some embodiments may determine that a first set of event types is a subgraph of a second set of event types and also a subgraph of a third set of event types. For example, some embodiments may include a first set of event types represented as a first graph portion of a graph database that include a first graph node storing the query parameter "white" and a second graph node storing the query parameter "sedan." Some embodiments may detect that the first graph portion is a subgraph of a second graph portion, where the second graph portion includes graph nodes representing the first and second event types as well a third event type represented by a third graph node storing the query parameter "carmaker1." Additionally, some embodiments may detect that the first graph portion is a subgraph of a third graph portion, where the third graph portion includes first and second graph nodes representing the first and second event types as well a fourth event type represented by a fourth graph node storing the query parameter "carmaker2." Some embodiments may update a graph database by directly associating the first subgraph with the second subgraph via a first graph edge associating the second graph node with the third graph node. Similarly, some embodiments may update a graph database by directly associating the first subgraph with the third subgraph via a second graph edge associating the second graph node with the fourth graph node.

Furthermore, some embodiments may assign probability weights to the first and second graph edges to indicate the likelihood that a first query sequence matching the first graph portion will transition into a second query sequence matching the second graph portion or a third query sequence matching the third graph portion. Some embodiments may determine the probability weights based on a ratio comparing the number of times that the transition occurs, with respect to each graph portion. For example, some embodiments may determine that a sequence matching a first event type sequence has transitioned to a sequence matching a second event type sequence sixty times and has transitioned to a sequence matching a third event type sequence forty times. Based on these counts, some embodiments may assign a first weight of 0.6 to a first graph edge representing the transition to a sequence matching a second event type sequence and a second weight of 0.4 to a second graph edge representing the transition to a sequence matching the third event type sequence. As described elsewhere in this disclosure, some embodiments may randomly or pseudo-randomly select a query parameter of either the second or third graph portion based on their corresponding weights when predicting a query parameter.

In the operation 432, some embodiments may predict a set of query parameters associated with the selected event type sequence. As described elsewhere in this disclosure, an event type sequence may include or otherwise be associated with one or more subsequent event types. For example, a selected event type sequence may point to a predicted event type based on a graph database, where one or more query parameters may be determined from the predicted event type. In some embodiments the set of query parameters may be directly listed as values of the predicted event type. For example, a predicted event type may include the value "maker7," and some embodiments may include the value "maker7" in the set of query parameters.

As described elsewhere in this disclosure, an event type sequence may have different possible subsequent event types, where the association to the different possible subsequent event types may have different weights assigned to them. For example, a first event type sequence may have a 30% chance of resulting in a second event type and a 70% chance of resulting in a third event type, where the second event type and the third event type may be mutually exclusive. Some embodiments may select the second event type or the third event type using a random or pseudorandom operation. Some embodiments may then determine the set of query parameters based on the selected event type.

In some embodiments, the set of predicted parameters may be associated with a terminal node representing a terminal event type of the event type sequence. For example, after determining that a sequence of events satisfies an event type sequence represented by a set of nodes, some embodiments may retrieve values of a node representing an event type that is indicated to occur after the terminal node of the set of nodes. The retrieved values may be predicted parameters for a query or may be used to determine the predicted parameters. For example, after determining a terminal event type of an event type sequence based on an input that includes a recent query and a set of viewed UI elements, some embodiments may retrieve a set of stored query parameters stored in association with a node representing the terminal event type for use as a set of predicted query parameters.

Some embodiments may also add new features to a database of features based on a predicted parameter. For example, some embodiments may predict that a future query will include the query parameter "car_feature01." Some embodiments may then access a vehicle features database to determine whether a vehicle feature that includes the vehicle feature value "car_feature01" is already stored in the vehicle features database. In response to a determination that the database of features does not include the vehicle feature value, some embodiments may add a new vehicle feature to the vehicle database based on the vehicle feature value. For example, some embodiments may add a new categorical feature column to a vehicle database, where at least one value of the column is "car_feature01." Some embodiments may then send instructions to a client computing device that updates the UI displayed on the client computing device, where the updated UI includes the newly added vehicle feature in the form of an interactive UI element, such as a button, slider, dropdown menu, or the like.

In the operation 436, some embodiments may send, via a first message, the predicted set of query parameters to a client computing device. As discussed elsewhere in this disclosure, the set of query parameters may be sent as a web message, such as in a web response to a previous web request sent from the client computing device. For example, after predicting that a future set of query parameters to be selected by a user will include the year range "2020-2025" and the color "red," some embodiments may send a hypertext transfer protocol (HTTP) web response to a client computing device that includes the array ' {years: "2020-2025", color: "red"}.' Alternatively, or in addition, the web response may include text representing a SQL query, such as "SELECT*FROM database1.cars WHERE years='2020-2025' AND color='red'," where an application executing on the client computing device may extract the query parameters "2020-2025" and "red" from the SQL query.

In the operation 440, a second message is obtained from the client computing device, where the client computing device executes an application that updates a set of user-provided parameters based on the set of predicted parameters and provides a web message that includes the updated parameters. As discussed elsewhere in this disclosure, the client computing device may execute an application that includes a UI. The application may determine a set of query parameters based on changes in the configurations of UI elements of the application UI.

In some embodiments, the application may then update the set of parameters selected by the user by replacing the set of predicted parameters with an indicator that the set of predicted parameters was entered into the UI. Some embodiments may then generate a web request that includes the updated set of parameters with the indicator instead the actual values of the set of predicted parameters. For example, some embodiments may obtain the predicted query parameters in form a list ['<100,000'; 'electric'; 'carmaker1']. Some embodiments may then generate a user-provided query that includes the SQL instructions "SELECT*FROM database1.cars WHERE mileage='<100,000' AND engineType='electric' AND mileage='<100,000' AND "carMaker='carmaker1.'" Some embodiments may then replace the entire query with a first value "111" to indicate that the set of predicted parameters matches the actual query parameters selected by a user. By using an indicator instead of the full set of predicted parameters, the outgoing web request from the client computing device reduces the amount data that is needed to be transferred from the client computing device.

In the operation 442, a combined query can be generated based on a parameter of the second message and the set of predicted parameters. In some embodiments, the combined message may include both the set of predicted parameters and the set of parameters from the second message. Some embodiments may generate the combined message based on an initial query string of the second message. For example, the second message may include a first parameter "1110" to indicate that a user had selected three parameters out of four predicted parameters, the set of predicted parameters indicating "mileage='<100,000'," "engineType='electric'," and "carMaker='carmaker1.'" The second message may also include the text "SELECT*FROM database1.cars WHERE carColor='red' AND year='2025+'" in the body of the second message. Some embodiments may then combine the predicted parameters to generate a combined query "SELECT*FROM database1.cars WHERE carColor='red' AND year='2025+' AND mileage='<100,000' AND engineType='electric' AND carMaker='carmaker1'" for record retrieval.

Some embodiments may generate a plurality of queries based on the set of predicted parameters or the parameters of the second message. For example, some embodiments may generate a first query comprising only the set of predicted parameters, a second query comprising the parameters indicated by the second message, and a third query comprising a subset of the predicted parameters and a subset of parameters of the second message. As discussed elsewhere in this disclosure, the generated plurality of queries may be used to display additional information to a user.

In the operation 444, a set of records is retrieved based on the client-sent query. Some embodiments may retrieve a set of vehicle records by submitting the combined query via an API of a database system. In response to receiving the query, some embodiments may provide a set of vehicle records, where the set of vehicle records may include a set of identifiers for the set of vehicles, vehicle images, previous vehicle users, vehicle-related attributes, or the like. As stated elsewhere in this disclosure, multiple queries may be generated based on a pair of predicted parameters and parameters obtained from a user-provided web message. In response, some embodiments may perform a search for each of the generated queries. As stated elsewhere in this disclosure, some embodiments may have initially searched a database based on a set of predicted parameters without receiving the second web message. After performing the initial search to retrieve a first set of records based on predicted parameters, some embodiments may determine that a combined query would produce records that are a subset of the first set of records. Some embodiments may then search through the first set of records based on the parameters of the predicted parameters to reduce the total number of records being queried, which may reduce the response time necessary to retrieve a search result for a user.

As stated elsewhere in this disclosure, some embodiments may display a set of records to a user based on predicted parameters in a second search window. For example, after receiving a web message including a set of search parameters, some embodiments may display a first window that includes a first set of search results based on a combined query. Some embodiments may also display a second window that includes a second set of search results based on a previously determined set of search parameters or a set of predicted search parameters predicted by the system based on the second web message.

In some embodiments, the various computers and subsystems illustrated in FIG. 1 may include one or more computing devices that are programmed to perform the functions described herein. The computing devices may include one or more electronic storages (e.g., e.g., database(s) 132, which may include vehicle database(s) 134, event types database(s) 136, account database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The network(s) 150 may include a network operating over the Internet, a mobile phone network, a mobile voice or data network (e.g., a 4G or LTE network), a cable network, a public switched telephone network, or other types of communications network or combinations of communications networks. The computing devices may include a plurality of hardware, software, and/or firmware components operating together. For example, the computing devices may be implemented by a cloud of computing platforms operating together as the computing devices.

The electronic storages may include non-transitory, computer-readable storage media that electronically stores information. The storage media of the electronic storages may include one or both of (i) system storage that is provided integrally (e.g., substantially non-removable) with servers or user devices; or (ii) removable storage that is removably connectable to the servers or user devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the set of processors, information obtained from servers, information obtained from user devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems or other components described herein is for illustrative purposes, and is not intended to be limiting, as any of subsystems other components may provide more or less functionality than is described. For example, one or more of subsystems may be eliminated, and some or all of its functionality may be provided by other ones of the subsystems.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" etc. refer to actions or processes of a specific apparatus, such as a special purpose computer or a similar special purpose electronic processing/computing device. As used in this application, updating data may include modifying data already stored in a storage or creating the data and storing the newly-created data in storage.

The present techniques will be better understood with reference to the following enumerated embodiments:

1. A method comprising: obtaining, via a set of previous vehicle-related web requests, a query sequence comprising queries from a user application executing on a client computing device; searching an events database based on the query sequence to select an event type sequence comprising a sequence of event nodes, the searching comprising matching each query of the query sequence with an event node of the event type sequence such that 1) a position of the query in the query sequence is the same as a position of the event node in the event type sequence, and 2) the query satisfies a set of criteria associated with the event node; sending, via a first web response, a set of predicted parameters associated with a terminal node of the event type sequence to the user application, the user application comprising instructions to: obtain, via a user interface of the user application, a set of parameters from a user, the set of parameters comprising the set of predicted parameters; update the set of parameters to remove the set of predicted parameters; and generate a first web request comprising the updated set of parameters and an indicator that the set of predicted parameters was entered into the user interface; obtaining, via the first web request, the updated set of parameters and the indicator; generating a combined query comprising the updated set of parameters and the set of predicted parameters in response to obtaining the indicator; retrieving a set of vehicle records from a vehicle database based on the combined query; and sending, via a second web response, a set of identifiers of the set of vehicle records to the client computing device.

2. A method comprising: obtaining a set of queries from an application executing on a client computing device, the set of queries used to retrieve vehicle records from a vehicle database; searching a first database based on the set of queries to select a set of event types, the searching comprising matching each respective query of the set of queries with a respective event type of the set of event types based on a determination that a respective set of query parameters of the respective query satisfy a respective set of criteria associated with the respective event type; sending, via a first message, a set of predicted parameters associated with the set of event types to the application, the application comprising instructions to: obtain a first parameter and the set of predicted parameters via a user interface of the application; and generate a second message comprising the first parameter and an indicator identifying the set of predicted parameters; obtaining, via the second message, the first parameter and the indicator; generating a combined query comprising the first parameter and the set of predicted parameters in response to obtaining the indicator; retrieving a vehicle record from the vehicle database based on the combined query; and sending, via a third message, values of the vehicle record to the client computing device.

3. A method comprising: obtaining a set of event values from an application executing on a client computing device; searching a first database based on the set of event values to select a set of event types, the searching comprising selecting the set of event types such that each criterion of a set of criteria associated with the set of event types is satisfied by at least one value of the set of event values; sending, via a first message, a predicted value associated with the set of event types to the application, the application comprising instructions to: obtain a first value and the predicted value via the application; generate a second message comprising the first value and an indicator identifying the predicted value; obtaining, via the second message, the first value and the indicator; generating a combined query comprising the first value and the predicted value; retrieving a record from a second database based on the combined query; and sending, via a second message, a value of the record to the client computing device.

4. The method of any of the preceding embodiments, further comprising: obtaining a set of coordinates from the client computing device indicating gaze locations; determining a cluster of gaze locations based on the set of coordinates; obtaining a set of regions of the user interface corresponding with a set of vehicle features of the vehicle database; selecting a region of the set of regions based on the cluster of gaze locations; and determining at least one value of the set of predicted parameters based on the cluster of gaze locations.

5. The method of any of the preceding embodiments, wherein: a first configuration of the user interface displays a user interface element corresponding with a first parameter of the set of predicted parameters in the first configuration, and sending the set of predicted parameters causes the user interface to reconfigure the user interface into a second configuration such that a screen position of the user interface element in the second configuration is above the screen position of the user interface element in the first configuration.

6. The method of any of the preceding embodiments, further comprising: accessing a user record associated with the user; determining a user category based on the user record; and obtaining a plurality of event type sequences associated with the user category, wherein selecting the event type sequence comprises selecting the event type sequence from the plurality of event type sequences.

7. The method of any of the preceding embodiments, further comprising: obtaining a set of gaze locations obtained via a gaze tracking operation performed by the client computing device; selecting a set of viewed user interface elements of the user interface based on the set of gaze locations and a set of user interface element positions; selecting a search filter based on the set of viewed user interface elements, wherein inputs to a first user interface element of the user interface updates the search filter; wherein: sending the first message comprises sending an identifier of the search filter; sending the first message causes the user interface to reconfigure the user interface from a first configuration into a second configuration such that a screen position of the first user interface element in the second configuration is above the screen position of the first user interface element in the first configuration.

8. The method of any of the preceding embodiments, further comprising: determining a network limit based on a set of performance metrics indicating network performance between the client computing device and a server obtaining the set of gaze locations; and providing the set of gaze locations by reducing a communication rate of the set of gaze locations based on the network limit.

9. The method of any of the preceding embodiments, further comprising: determining a similarity value based a count of shared query parameters between a first query of the set of queries and a second query of the set of queries; determining whether the similarity value satisfies a first threshold; and in response to a determination that the similarity value satisfies the first threshold, assigning a first category value to the second query, wherein searching the first database comprises matching a first event type of the set of event types to the second query based on the first category value.

10. The method of any of the preceding embodiments, wherein the similarity value is a first similarity value, the operations further comprising: determining a second similarity value based a second count of shared query parameters between the second query and a third query of the set of queries; determining whether the second similarity value satisfies a second threshold; and in response to a determination that the similarity value satisfies the second threshold, assign a second category value to the second query, wherein searching the first database comprises matching a second event type of the set of event types to the third query based on the second category value.

11. The method of any of the preceding embodiments, wherein: the set of event types is a first set of event types; the first database is a graph database comprising a plurality of graph nodes representing the set of event types, a set of graph edges between graph nodes, and category values for the set of graph edges; and searching the first database comprises traversing at least one graph edge of the set of graph edges.

12. The method of any of the preceding embodiments, wherein the set of queries is a first set of queries, and wherein the set of event types is a first set of event types, the operations further comprising: obtaining a second set of queries; determining whether the second set of queries satisfies a second set of criteria based on a plurality of sets of event types, wherein the plurality of sets of event types comprises the first set of event types; in response to a determination that the second set of queries satisfies the second set of criteria, generating a second set of event types based on the second set of queries; and storing the second set of event types in the first database.

13. The medium of claim 11, wherein generating the second set of event types comprises: obtaining a plurality of query sequences, wherein the plurality of query sequences comprises the second set of queries; determining a first shared value and a second shared value, wherein, for each respective query sequence of the plurality of query sequences: the first shared value is used in at least one query of the respective query sequence; the second shared value is used in at least one query of the respective query sequence, wherein the first shared value and the second shared value are used in different queries of the respective query sequence; and generating the second set of event types based on the first shared value and the second shared value.

14. The method of any of the preceding embodiments, wherein the set of event types is a first set of event types, the operations further comprising: determining that the first set of event types is a subgraph of a second set of event types and a third set of event types; generating a first association between a terminal event type of the first set of event types and an event type of the second set of event types, wherein the first association is assigned a first weight; and generating a second association between the terminal event type of the first set of event types and an event type of the third set of event types, wherein the second association is assigned a second weight, wherein determining the set of predicted parameters comprises determining the set of predicted parameters based on the first weight and the second weight.

15. The method of any of the preceding embodiments, wherein: determining the set of predicted parameters comprises determining a predicted query based on a terminal event of the set of event types; and the first message comprises the predicted query.

16. The method of any of the preceding embodiments, wherein the vehicle record is a first vehicle record, the operations further comprising: accessing the vehicle database to perform a search based on the predicted query without first receiving the second message from the client computing device; obtaining a second vehicle record based on the search with the predicted query; and sending values the second vehicle record to the client computing device.

17. The method of any of the preceding embodiments, further comprising: determining whether the set of predicted parameters corresponds with a set of vehicle features of the first database, wherein records of the first database comprise vehicle feature values corresponding with the set of vehicle features; in response to a determination that a first predicted parameter of the set of predicted parameters does not correspond with the set of vehicle features, generate a new vehicle feature based on the first predicted parameter; and storing the new vehicle feature in the first database.

18. The method of any of the preceding embodiments, wherein: obtaining the set of event values comprises obtaining a first subset of event values and obtaining a second subset of event values that is different from the first subset of event values; obtaining the first subset of event values comprises obtaining a set of query parameters via a set of user interface elements of the application; and obtaining the second subset of event values comprises obtaining a set of gaze locations indicating positions of a human eye on the application.

19. The method of any of the preceding embodiments, wherein determining the predicted value comprises determining the predicted value using a recurrent neural network, wherein a set of category values of the set of event values and the order by which the set of category values are received are used as inputs for the recurrent neural network.

20. The method of any of the preceding embodiments, wherein the set of event values is a first set of event values, and wherein the set of event types is a first set of event types, the method further comprising: determining that a first terminal node of a second set of event types is associated with a first record of the first database, wherein the second set of event types is selected based on a second set of event values; determining whether a second terminal node of a third set of event types is associated with the first record, wherein the third set of event types is selected based on a third set of event values; in response to a determination that the second terminal node is associated with the first record, determining a set of shared event values between the second set of event values and the third set of event values; and generating the first set of event types based on the set of shared event values.

21. A non-transitory, computer-readable media storing instructions that, when executed by one or more processors, effectuate operations comprising those of any of embodiments 1 to 20.

22. A system comprising: one or more processors; and memory storing instructions that, when executed by the processors, cause the processors to effectuate operations comprising those of any of embodiments 1 to 20.

What is claimed is:

1. A system for reducing network resource utilization comprising a set of memory devices storing instructions and a set of processors configured to execute the instructions, the instructions comprising:
   obtaining, via a set of previous vehicle-related web requests, a query sequence comprising queries from a user application executing on a client computing device;
   searching an events database based on the query sequence to select an event type sequence comprising a sequence of event nodes, the searching comprising matching each query of the query sequence with an event node of the event type sequence such that 1) a position of the query in the query sequence is the same as a position of the event node in the event type sequence, and 2) the query satisfies a set of criteria associated with the event node;
   sending, via a first web response, a set of predicted query parameters associated with a terminal node of the event type sequence to the user application, the user application comprising instructions to:
      obtain, via a user interface of the user application, a set of query parameters that is entered by a user, the set of query parameters comprising the set of predicted query parameters; and
      generate an updated set of query parameters for a first web request by replacing, in the first web request, the set of predicted query parameters with an indicator that the set of predicted query parameters was entered into the user interface;
   obtaining, via the first web request, the updated set of query parameters and the indicator;
   generating a combined query comprising the updated set of query parameters and the set of predicted query parameters in response to obtaining the indicator;
   retrieving a set of vehicle records from a vehicle database based on the combined query; and
   sending, via a second web response, a set of identifiers of the set of vehicle records to the client computing device.

2. The system of claim 1, the instructions further comprising:
   obtaining a set of coordinates from the client computing device indicating gaze locations;
   determining a cluster of gaze locations based on the set of coordinates;
   obtaining a set of regions of the user interface corresponding with a set of vehicle features of the vehicle database;
   selecting a region of the set of regions based on the cluster of gaze locations; and
   determining at least one value of the set of predicted query parameters based on the cluster of gaze locations.

3. The system of claim 1, wherein:
   a first configuration of the user interface displays a user interface element corresponding with a first parameter of the set of predicted query parameters in the first configuration, and
   sending the set of predicted query parameters causes the user interface to reconfigure the user interface into a second configuration such that a screen position of the user interface element in the second configuration is above the screen position of the user interface element in the first configuration.

4. The system of claim 1, the instructions further comprising:
   accessing a user record associated with the user;
   determining a user category based on the user record; and
   obtaining a plurality of event type sequences associated with the user category, wherein selecting the event type sequence comprises selecting the event type sequence from the plurality of event type sequences.

5. One or more non-transitory, machine-readable media storing instructions that, when executed by one or more processors, performs operations comprising:
   obtaining a set of queries from an application executing on a client computing device, the set of queries used to retrieve vehicle records from a vehicle database;
   searching a first database based on the set of queries to select a set of event types, the searching comprising matching each respective query of the set of queries with a respective event type of the set of event types based on a determination that a respective set of query parameters of the respective query satisfy a respective set of criteria associated with the respective event type;
   sending, via a first message, a set of predicted query parameters associated with the set of event types to the application, the application comprising instructions to:
      obtain a first parameter and the set of predicted query parameters via a user interface of the application; and
      generate a second message comprising the first parameter and an indicator identifying the set of predicted query parameters as being entered into the user interface, wherein the indicator is used in the second message in lieu of the set of predicted query parameters;

obtaining, via the second message, the first parameter and the indicator;

generating a combined query comprising the first parameter and the set of predicted query parameters in response to obtaining the indicator;

retrieving a vehicle record from the vehicle database based on the combined query; and sending, via a third message, values of the vehicle record to the client computing device.

6. The one or more media of claim 5, the operations further comprising:

obtaining a set of gaze locations obtained via a gaze tracking operation performed by the client computing device;

selecting a set of viewed user interface elements of the user interface based on the set of gaze locations and a set of user interface element positions; and selecting a search filter based on the set of viewed user interface elements, wherein inputs to a first user interface element of the user interface updates the search filter; wherein:

sending the first message comprises sending an identifier of the search filter; and sending the first message causes the user interface to reconfigure the user interface from a first configuration into a second configuration such that a screen position of the first user interface element in the second configuration is above the screen position of the first user interface element in the first configuration.

7. The one or more media of claim 6, the operations further comprising:

determining a network limit based on a set of performance metrics indicating network performance between the client computing device and a server obtaining the set of gaze locations; and providing the set of gaze locations by reducing a communication rate of the set of gaze locations based on the network limit.

8. The one or more media of claim 5, the operations further comprising:

determining a similarity value based a count of shared query parameters between a first query of the set of queries and a second query of the set of queries;

determining whether the similarity value satisfies a first threshold; and in response to a determination that the similarity value satisfies the first threshold, assigning a first category value to the second query, wherein searching the first database comprises matching a first event type of the set of event types to the second query based on the first category value.

9. The one or more media of claim 8, wherein the similarity value is a first similarity value, the operations further comprising:

determining a second similarity value based a second count of shared query parameters between the second query and a third query of the set of queries;

determining whether the second similarity value satisfies a second threshold; and in response to a determination that the similarity value satisfies the second threshold, assign a second category value to the second query, wherein searching the first database comprises matching a second event type of the set of event types to the third query based on the second category value.

10. The one or more media of claim 5, wherein:

the set of event types is a first set of event types;

the first database is a graph database comprising a plurality of graph nodes representing the set of event types, a set of graph edges between graph nodes, and category values for the set of graph edges; and searching the first database comprises traversing at least one graph edge of the set of graph edges.

11. The one or more media of claim 5, wherein the set of queries is a first set of queries, and wherein the set of event types is a first set of event types, the operations further comprising:

obtaining a second set of queries;

determining whether the second set of queries satisfies a second set of criteria based on a plurality of sets of event types, wherein the plurality of sets of event types comprises the first set of event types;

in response to a determination that the second set of queries satisfies the second set of criteria, generating a second set of event types based on the second set of queries; and storing the second set of event types in the first database.

12. The one or more media of claim 11, wherein generating the second set of event types comprises:

obtaining a plurality of query sequences, wherein the plurality of query sequences comprises the second set of queries;

determining a first shared value and a second shared value, wherein, for each respective query sequence of the plurality of query sequences:

the first shared value is used in at least one query of the respective query sequence;

the second shared value is used in at least one query of the respective query sequence, wherein the first shared value and the second shared value are used in different queries of the respective query sequence; and generating the second set of event types based on the first shared value and the second shared value.

13. The one or more media of claim 5, wherein the set of event types is a first set of event types, the operations further comprising:

determining that the first set of event types is a subgraph of a second set of event types and a third set of event types;

generating a first association between a terminal event type of the first set of event types and an event type of the second set of event types, wherein the first association is assigned a first weight; and generating a second association between the terminal event type of the first set of event types and an event type of the third set of event types, wherein the second association is assigned a second weight, wherein determining the set of predicted query parameters comprises determining the set of predicted query parameters based on the first weight and the second weight.

14. The one or more media of claim 5, wherein:

determining the set of predicted query parameters comprises determining a predicted query based on a terminal event of the set of event types; and the first message comprises the predicted query.

15. The one or more media of claim 14, wherein the vehicle record is a first vehicle record, the operations further comprising:

accessing the vehicle database to perform a search based on the predicted query without first receiving the second message from the client computing device;

obtaining a second vehicle record based on the search with the predicted query; and sending values to the second vehicle record to the client computing device.

16. The one or more media of claim 5, further comprising:

determining whether the set of predicted query parameters corresponds with a set of vehicle features of the first database, wherein records of the first database comprise vehicle feature values corresponding with the set of vehicle features;

in response to a determination that a first predicted query parameter of the set of predicted query parameters does not correspond with the set of vehicle features, generate a new vehicle feature based on the first predicted query parameter; and storing the new vehicle feature in the first database.

17. A method comprising:

obtaining a set of event values from an application executing on a client computing device;

searching a first database based on the set of event values to select a set of event types, the searching comprising selecting the set of event types such that each criterion of a set of criteria associated with the set of event types is satisfied by at least one value of the set of event values;

sending, via a first message, a set of predicted query values associated with the set of event types to the application, the application comprising instructions to:
obtain a first query value and the set of predicted query values via the application;
generate a second message comprising the first query value and an indicator that the set of predicted query values is entered into the application;

obtaining, via the second message, the first query value and the indicator;

generating a combined query comprising the first query value and the set of predicted query values based on the indicator;

retrieving a record from a second database based on the combined query; and sending, via a third message, a value of the record to the client computing device.

18. The method of claim 17, wherein:

obtaining the set of event values comprises obtaining a first subset of event values and obtaining a second subset of event values that is different from the first subset of event values;

obtaining the first subset of event values comprises obtaining a set of query parameters via a set of user interface elements of the application; and obtaining the second subset of event values comprises obtaining a set of gaze locations indicating positions of a human eye on the application.

19. The method of claim 17, wherein determining the set of predicted query values comprises determining the set of predicted query values using a recurrent neural network, wherein a set of category values of the set of event values and an order by which the set of category values are received are used as inputs for the recurrent neural network.

20. The method of claim 17, wherein the set of event values is a first set of event values, and wherein the set of event types is a first set of event types, the method further comprising:

determining that a first terminal node of a second set of event types is associated with a first record of the first database, wherein the second set of event types is selected based on a second set of event values;

determining a result indicating that a second terminal node of a third set of event types is associated with the first record, wherein the third set of event types is selected based on a third set of event values;

determining a set of shared event values between the second set of event values and the third set of event values based on the result; and generating the first set of event types based on the set of shared event values.

\* \* \* \* \*